United States Patent
Bogacz et al.

(10) Patent No.: US 12,413,828 B1
(45) Date of Patent: Sep. 9, 2025

(54) SYSTEMS AND METHODS FOR REAL-TIME STREAMING OF THREE-DIMENSIONAL CONTENT USING DIFFERENT ENCODING FORMATS

(71) Applicant: Illuscio, Inc., Culver City, CA (US)

(72) Inventors: Joseph Bogacz, Perth (CA); Joseph Nordling, Roeland Park, KS (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 19/195,876

(22) Filed: May 1, 2025

(51) Int. Cl.
    *H04N 21/81* (2011.01)
    *G06T 15/00* (2011.01)
    *H04N 21/234* (2011.01)

(52) U.S. Cl.
    CPC ....... *H04N 21/8146* (2013.01); *G06T 15/005* (2013.01); *H04N 21/234* (2013.01)

(58) Field of Classification Search
CPC . H04N 21/8146; H04N 21/234; G06T 15/005
See application file for complete search history.

(56) References Cited

U.S. PATENT DOCUMENTS 9,723,291 B2 * 8/2017 Lee ............... H04N 21/234318
2024/0205379 A1 * 6/2024 Monaghan ......... H04N 21/2668

* cited by examiner

*Primary Examiner* — Kyu Chae
(74) *Attorney, Agent, or Firm* — Ansari Katiraei LLP; Arman Katiraei; Sadiq Ansari (57) ABSTRACT

A real-time streaming system and associated methods are provided for initially presenting three-dimensional (3D) content at a low-fidelity first encoding format so that the initial visualization of the 3D content on the requesting device is presented with no or insignificant delay and for streaming prioritized 3D assets within the initial visualization at higher fidelities in different encoding formats that preserve the real-time responsiveness of the system. The system generates and streams a two-dimensional (2D) image for a first presentation of the 3D content at a first fidelity. The system increases a fidelity of a prioritized 3D asset while the 3D content does not change by streaming 3D primitives for the prioritized 3D asset in a second encoding format that increases the fidelity of the prioritized 3D asset in a second presentation of the 3D content from the first fidelity to a greater second fidelity.

20 Claims, 6 Drawing Sheets

SYSTEMS AND METHODS FOR REAL-TIME STREAMING OF THREE-DIMENSIONAL CONTENT USING DIFFERENT ENCODING FORMATS

BACKGROUND

Three-dimensional (3D) content streaming is challenging because of the amount of data that is transferred to generate each frame or visualization of the 3D content. Compared to streaming two-dimensional (2D) content, each frame or visualization that is generated from streamed 3D content may have orders of magnitude more data. Consequently, it may take several seconds of buffering before the 3D primitives for rendering a first frame or visualization of requested 3D content are received by a user device.

Other factors affecting the real-time streaming of 3D content is the large amounts of data required for streaming subsequent frames or visualizations after the first frame or visualization. For instance, the subsequent frames or visualizations may also contain more data than can be streamed in time for a continuous and/or uninterrupted experience. Continual or repeated buffering further disrupts the real-time experience.

The amounts of data streamed for each frame or visualization of the 3D content may be reduced by reducing the quality or resolution of the 3D content as is done with current adaptive streaming techniques. However, uniformly reducing the quality or resolution of the 3D content until the streamed 3D content fits within the available bandwidth may result in important visual detail being lost and an unsatisfactory or unacceptable presentation of the 3D content.

DETAILED DESCRIPTION OF PREFERRED EMBODIMENTS

The following detailed description refers to the accompanying drawings. The same reference numbers in different drawings may identify the same or similar elements.

Provided are systems and associated methods for real-time streaming of three-dimensional (3D) content using different encoding formats. The real-time streaming presents an initial frame, visualization, or animation of the 3D content with no or insignificant delay on a client device by streaming the initial frame, visualization, or animation in a low-fidelity and/or low-bandwidth optimized first encoding format. Specifically, the low-fidelity and/or low-bandwidth optimized first encoding format allows the real-time streaming system to present the initial frame, visualization, or animation less than one second after the 3D content is requested in order to initialize the real-time streaming experience. The real-time streaming further includes determining the available bandwidth and/or network performance to the client device, and streaming various prioritized 3D assets within the initial frame, visualization, or animation in one or more other encoding formats that progressively increase the fidelity of the prioritized 3D assets based on the amount of bandwidth and/or network performance that remains for streaming the initial frame, visualization, or animation in real-time. In other words, after presenting the low-fidelity and/or low-bandwidth optimized first encoding format, the real-time streaming system may gradually increase the quality and/or detail of various 3D assets until the field-of-view changes or it is time to stream a next frame, visualization, or animation such that the 3D streaming experience is continuous and uninterrupted from one frame, visualization, or animation to the next. The real-time streaming includes dynamically switching between the one or more other encoding formats to maximize the fidelity or quality for 3D assets in subsequently streamed frames, visualizations, or animations of the 3D content and to ensure that the total data for the subsequently streamlined frames, visualizations, or animations may be streamed in real-time such that the viewing of the 3D content is continuous and uninterrupted on the client device.

In some embodiments, the real-time streaming may include streaming one or more of the 3D assets as a two-dimensional (2D) image, a mesh model, a splat representation, a point cloud, and/or another 3D format. The 2D image encoding format is optimized to stream the 3D assets at a lowest fidelity with the least amount of data. The mesh encoding format is optimized to stream the 3D assets as a set of meshes that generate a first range of fidelities, that are greater than the lowest fidelity, with less data than the 3D primitives of other encoding formats at the same first range of fidelities. The splat encoding format is optimized to stream the 3D assets as a set of splats (e.g., Gaussian splats) that generate a second range of fidelities, that are greater than the first range of fidelities, with less data than the 3D primitives of other encoding formats at the same second range of fidelities. The point cloud encoding format is optimized to stream the 3D assets as a distributed set of points that generate the greatest fidelity regardless of the data size.

Figure 1:
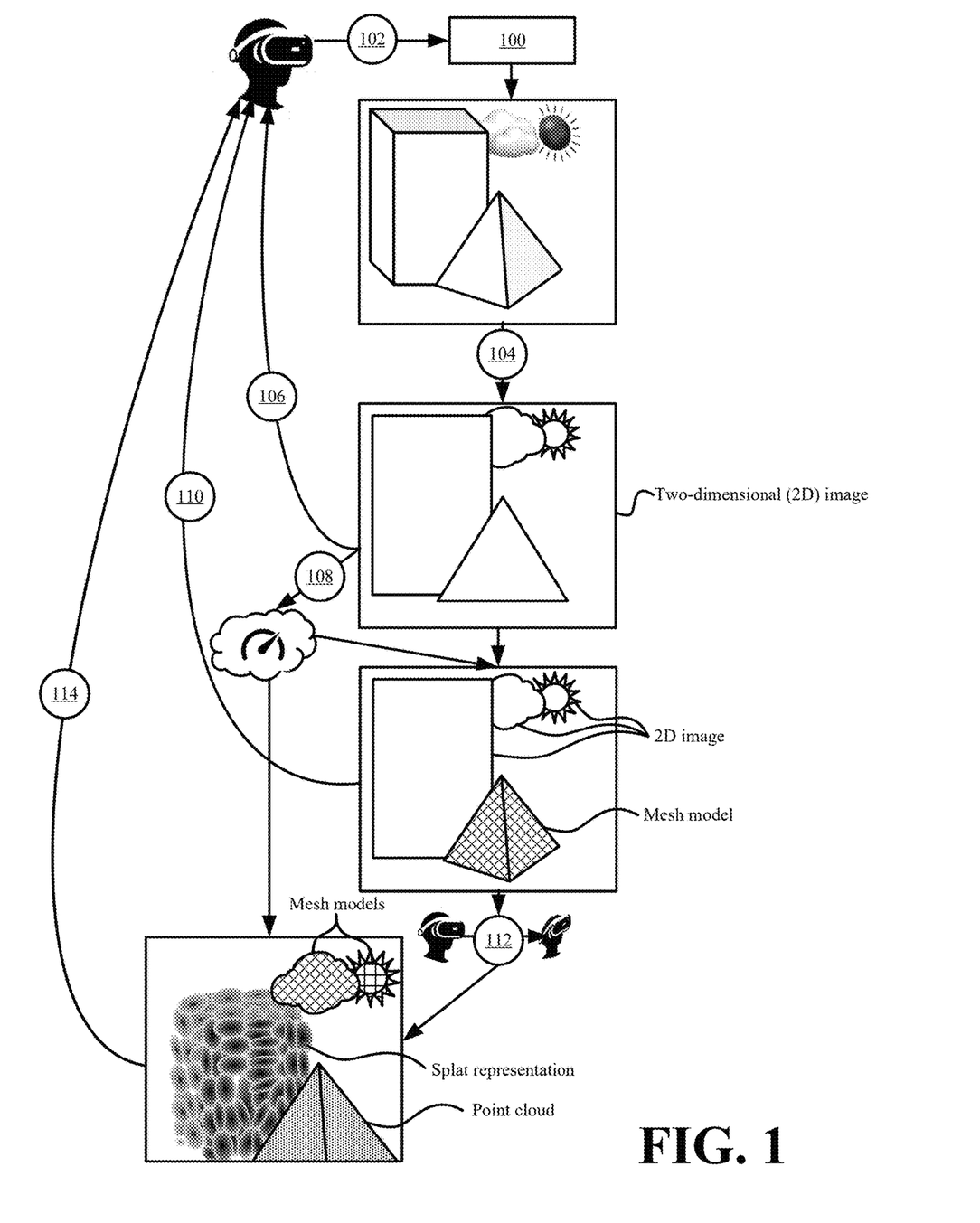
FIG. 1 illustrates an example of real-time streaming of three-dimensional (3D) content using different encoding formats in accordance with some embodiments presented herein.

FIG. 1 illustrates an example of the real-time streaming of 3D content using different encoding formats in accordance with some embodiments presented herein. Real-time streaming system 100 receives (at 102) a request to stream 3D content to a user device. The user device may include a spatial computing device, a virtual reality, augmented reality, mixed reality, or enhanced reality device or headset, a gaming device, a smartphone, a laptop computer, a desktop computer, and/or other computing device that is network-enabled and capable of rendering 3D graphics or environments.

The request may specify a particular field-of-view from which to initially view the 3D content. In some embodiments, the particular field-of-view may correspond to a default field-of-view that is presented to all users that request the 3D content.

In this example, the request is for static 3D content. The static 3D content includes a 3D scene or 3D environment that does not change without user input. The user input may include changing the field-of-view or where the user is looking within the 3D scene or 3D environment, and may include moving within the 3D scene or 3D environment to move closer to certain visual elements or to view certain visual elements from different perspectives. The static 3D content may also include a 3D scene or 3D environment with interactive visual elements that a user may reposition or that respond to a user input.

Real-time streaming system 100 encodes (at 104) a first frame or visualization of the 3D content as a 2D image (e.g., a first encoding format). Encoding (at 104) the first frame or visualization may include retrieving the 3D assets that are included in the first frame or visualization in a highest quality encoding format (e.g., point clouds) or lowest quality 3D encoding format (e.g., mesh models), positioning the 3D assets in a 3D space according to positioning defined for the 3D assets in the particular field-of-view or the first frame or visualization, and/or rendering the 3D assets as the 2D image. In some embodiments, the 3D assets may be stored in the different encoding formats, and real-time streaming system 100 may retrieve the 2D image that is stored for each 3D asset and may combine the 2D images as a single composite 2D image.

Real-time streaming system 100 streams (at 106) the 2D image to the user device in response to the request. The 2D image may be encoded (at 104) and streamed (at 106) to the user device in under one second to present the first frame or visualization in real-time with no or minimal delay. Accordingly, streaming (at 106) the 2D image provides a real-time responsiveness for the streamed 3D content even though the details and dimensionality of the 3D content are significantly reduced in the 2D image relative to the highest fidelity encoding and rendering of the 3D assets.

In some embodiments, the first frame or visualization may be continually presented on the user device until the user device provides input to change the field-of-view associated with the first frame or visualization. The user may change the field-of-view by providing input that changes a position and/or orientation of a virtual camera in the 3D space of the 3D content. The input may include a tracked head movement, a controller input, or other input to look or move within the 3D space of the 3D content. Accordingly, real-time streaming system 100 has time to improve the fidelity of the first frame or visualization until the field-of-view changes in response to a user input.

Real-time streaming system 100 monitors (at 108) the performance of the network connecting real-time streaming system 100 to the user device. For instance, real-time streaming system 100 may measure the available bandwidth, latency, and/or other network performance parameters while streaming (at 106) the 2D image to the user device.

Real-time streaming system 100 selectively streams (at 110) one or more 3D assets in the first frame or visualization using a different higher quality or higher fidelity encoding format based on the monitored (at 108) network performance and no changes being made to the field-of-view. For instance, real-time streaming system 100 may stream (at 110) the one or more 3D assets as mesh models that provide a first higher fidelity and a first larger size relative to the 2D image in response to the network performance not exceeding a particular performance threshold, and may skip the mesh models and stream (at 110) the one or more 3D assets as splat representations that provide a second higher fidelity and a second larger size relative to the mesh models in response to the network performance exceeding the particular performance threshold.

Real-time streaming system 100 may prioritize the one or more 3D assets to stream (at 110) at the higher quality or higher fidelity encoding formats based on the depth, position, and/or size of the one or more 3D assets relative to other 3D assets in the first frame or visualization. For instance, real-time streaming system 100 may stream the 3D assets that are frontmost, centermost, and that occupy the largest size in the first frame or visualization in the next higher quality or fidelity encoding format (e.g., as a mesh model) before streaming (at 110) the 3D assets that are further and further removed from the front, center, and/or that occupy smaller sizes in the first frame or visualization at the next higher quality or fidelity encoding formats. In some embodiments, real-time streaming system 100 may not stream some 3D assets at the higher fidelity encoding formats based on their depth, position, and/or size in the field-of-view. For instance, additional detail for 3D assets that are positioned in the background and are visually small in the field-of-view may be unresolvable by the human eye such that there is no benefit for streaming the 3D assets with the additional data for the higher fidelity encoding formats.

Real-time streaming system 100 detects (at 112) a user input that changes the field-of-view for the static 3D content. The user input may cause new 3D assets to come into the changed field-of-view and/or previously streamlined 3D assets to be repositioned and/or resized in the changed field-of-view. Accordingly, the user input triggers a request for a next frame or visualization of the 3D content from the changed field-of-view.

Real-time streaming system 100 selectively streams (at 114) the 3D assets in the next frame or visualization at different fidelities using different encoding formats to increase the fidelity and data allocation for the 3D assets at the front, center, and/or that occupy the largest area in the next frame or visualization relative to the 3D assets in the background, periphery, and/or that occupy increasing smaller areas in the next frame or visualization until the data for the 3D assets in the different encoding formats reaches or nears the total data that may be streamed to the user device to retain a continuous and uninterrupted 3D content streaming and/or viewing experience. The total amount of data to stream for the continuous and uninterrupted 3D content streaming experience is determined based on the monitored (at 108) network performance and may correspond to the amount of data that may be streamed to the user device to maintain a real-time responsiveness to the user input. For instance, the real-time responsiveness may include streaming, rendering, and/or presenting the next frame or visualization within a specified amount of the time (e.g., less than one second) of the user input being issued.

By encoding the 3D assets of the 3D content in the different encoding formats, real-time streaming system 100 adapts the 3D content for streaming and presentation in real-time on the user device with no or minimal delay. In particular, the first frame or visualization of the 3D content is presented immediately after being requested by the user device at a low fidelity that gradually increases with subsequent frames or visualizations of the 3D content depending on network performance. Moreover, the fidelity is selectively increased for the prioritized 3D assets that are most visible in the field-of-view including the 3D assets that are presented in the foreground, center, and/or at a large size in the field-of-view as resources and time permit. Consequently, real-time streaming system 100 maximizes the fidelity of the prioritized 3D assets based on the available bandwidth and/or network resources without compromising on the real-time delivery of the 3D content. In other words, real-time streaming system 100 provides responsiveness that appears immediate in the sense that the presentation of the requested and streamed 3D content occurs after the request is issued with no or minimal delay and updates to the 3D content similarly occur with no or minimal delay such that the entire experience feels immediate, continuous, and uninterrupted.

Figure 2:
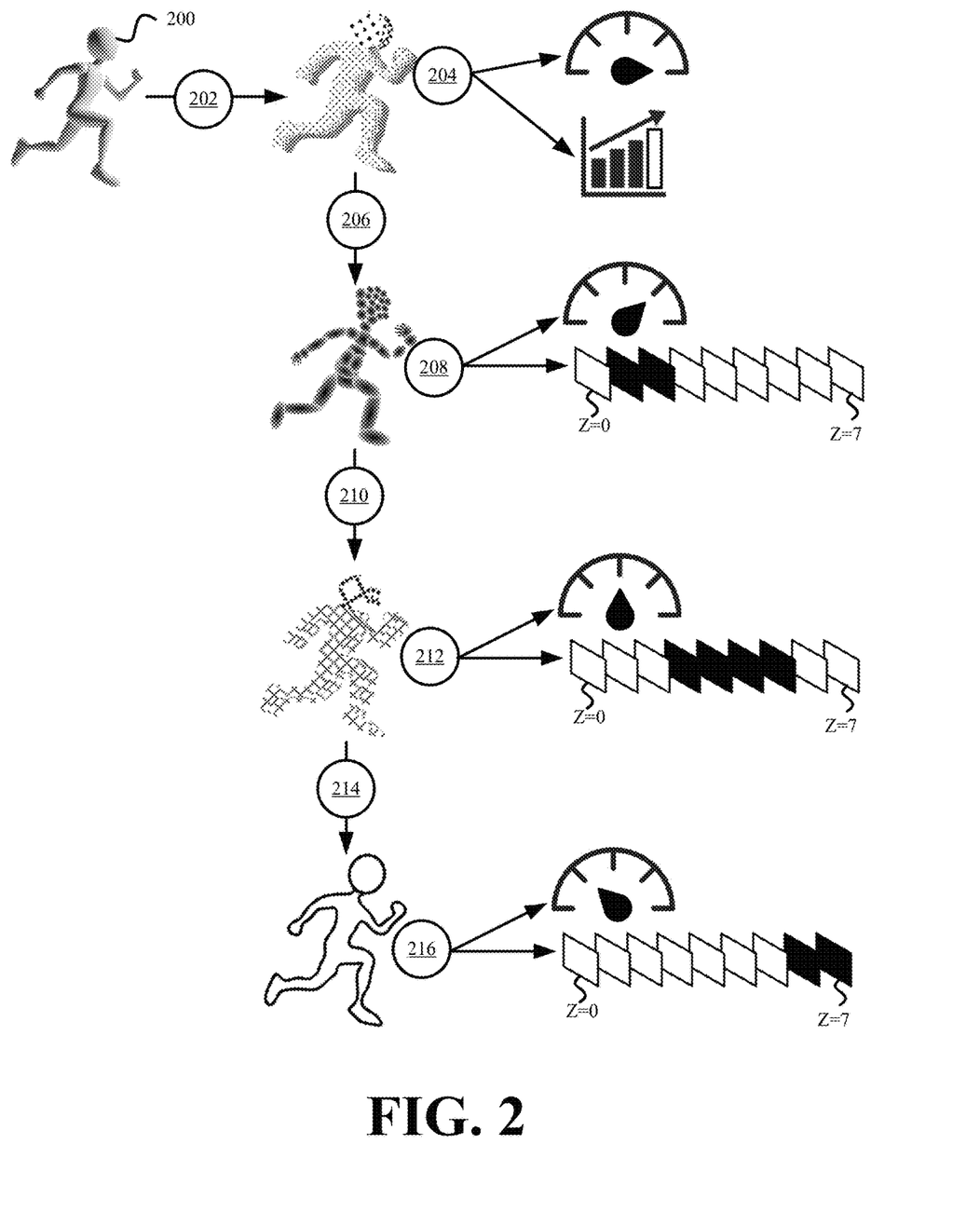
FIG. 2 illustrates an example of generating a 3D asset in different encoding formats for streaming in response to changing network performance in accordance with some embodiments presented herein.

FIG. 2 illustrates an example of generating a 3D asset in different encoding formats for streaming in response to changing network performance in accordance with some embodiments presented herein. 3D asset 200 may include a 3D definition of an object, character, or other 3D visual element. 3D asset 200 may represent streamable 3D content or may be included with other 3D assets in a 3D space to create 3D content.

3D asset 200 may be defined (at 202) and/or stored in a first encoding format. The first encoding format may represent the highest fidelity and largest size encoding of 3D asset 200. For instance, real-time streaming system 100 may store and use a point cloud representation of 3D asset 200 in order to generate all lower fidelity and smaller size encodings of 3D asset 200. The point cloud representation of 3D asset 200 is defined with a densely distributed set of disconnected points that blend together to recreate microscopic details of an object. Each point may be defined with its own position in 3D space (e.g., x, y, and z coordinates) and with visual characteristics (e.g., red, green, blue color value, opacity, reflectivity, etc.).

In some embodiments, real-time streaming system 100 streams (at 204) 3D asset 200 encoded in the first encoding format in response to the available network performance exceeding a first threshold. For instance, the network has a bandwidth of 1 gigabit per second, 3D asset 200 encoded in the first encoding format has a size of 100 megabytes, and the real-time responsiveness is configured to be less than one second. In some other embodiments, real-time streaming system 100 streams (at 204) 3D asset 200 in the first encoding format when the next highest fidelity encoding (e.g., a splat representation) of 3D asset 200 has already been streamed to a user device and there is additional time (e.g., the 3D content field-of-view does not change or there is no change to the previously streamed 3D assets) to begin streaming the points of the point cloud representation.

Real-time streaming system 100 encodes (at 206) 3D asset 200 in a second encoding format that generates 3D asset 200 in a first range of fidelities with a size or a total amount of encoded data that is less than what the other encoding formats may generate for the same first range of fidelities. For instance, two or more encoding formats may be able to generate fine detail for individual hairs of a character. However, the second encoding format may be able to generate that level of fidelity with less data than the other encoding formats.

Encoding (at 206) 3D asset 200 in the second encoding format may include converting 3D asset 200 from a point cloud representation to a 3D Gaussian splat representation such that the first range of fidelities is lower than the highest fidelity of the first encoding format and presents 3D asset 200 with some loss of detail relative to the highest fidelity encoding of 3D asset 200. For instance, real-time streaming system 100 may replace two or more points of the point cloud representation with a single splat to reduce the number of 3D primitives used in the second encoding format to represent 3D asset 200 relative to the first encoding format and to reduce the size of the second encoding format relative to the first encoding format.

Real-time streaming system 100 streams (at 208) 3D asset encoded in the second encoding format in response to the available network performance being less than the first threshold and greater than a second threshold that supports a real-time streaming of the data for 3D asset 200 encoded in the second encoding format. Moreover, real-time streaming system 100 may stream (at 208) 3D asset 200 encoded in the second encoding format when the first range of fidelities provides the maximum amount of detail or fidelity that a human eye resolves at the depth, position, and/or size of 3D asset 200 in a field-of-view.

Real-time streaming system 100 encodes (at 210) 3D asset 200 in a third encoding format that generates 3D asset 200 in a second range of fidelities with a size or a total amount of encoded data that is less than what the other encoding formats may generate for the same second range of fidelities. Encoding (at 210) 3D asset 200 in the third encoding format may include converting 3D asset 200 from a point cloud representation to a mesh model such that the second range of fidelities is lower than the first range of fidelities of the second encoding format and presents 3D asset 200 with greater loss of detail relative to the second encoding format. For instance, real-time streaming system 100 may replace regions within a splat representation that are represented by two or more layered splats in the second encoding format with a single polygon or mesh. The third encoding format therefore represents 3D asset 200 with lower fidelity and less data than either the second encoding format or the first encoding format.

Real-time streaming system 100 streams (at 212) 3D asset 200 encoded in the third encoding format in response to the available network performance being less than the second threshold and greater than a third threshold that supports a real-time streaming of the data for 3D asset 200 encoded in the third encoding format. Moreover, real-time streaming system 100 may stream (at 212) 3D asset 200 encoded in the third encoding format when the second range of fidelities provides the maximum amount of detail or fidelity that a human eye resolves at the depth, position, and/or size of 3D asset 200 in a field-of-view.

Real-time streaming system 100 encodes (at 214) 3D asset 200 in a fourth encoding format that generates 3D asset 200 with a lowest fidelity and smallest size relative to the other encoding formats. Encoding (at 214) 3D asset 200 in the fourth encoding format may include rendering 3D asset 200 from any 3D format to a 2D image.

Real-time streaming system 100 streams (at 216) 3D asset 200 encoded in the fourth encoding format in response to the available network performance being less than the third threshold that does not support a real-time streaming for the data of 3D asset 200 encoded in any of the higher fidelity encoding formats. Moreover, real-time streaming system 100 may stream (at 216) 3D asset 200 encoded in the fourth encoding format when the lowest fidelity provides the maximum amount of detail or fidelity that a human eye resolves at the depth, position, and/or size of 3D asset 200 in a field-of-view.

Dynamic 3D content such as 3D videos, 3D animations, 3D games, and/or other 3D content that is continually changing with or without user input presents an additional challenge for real-time streaming because the dynamic 3D content is streamed at a constant or near constant frame rate in order to provide a seamless and continuous experience. As such, real-time streaming system 100 may have less time and/or less data with which to stream each frame or visualization of the dynamic 3D content. Nevertheless, real-time streaming system 100 may use the different encoding formats to accommodate the real-time streaming of dynamic 3D content.

Figure 3:
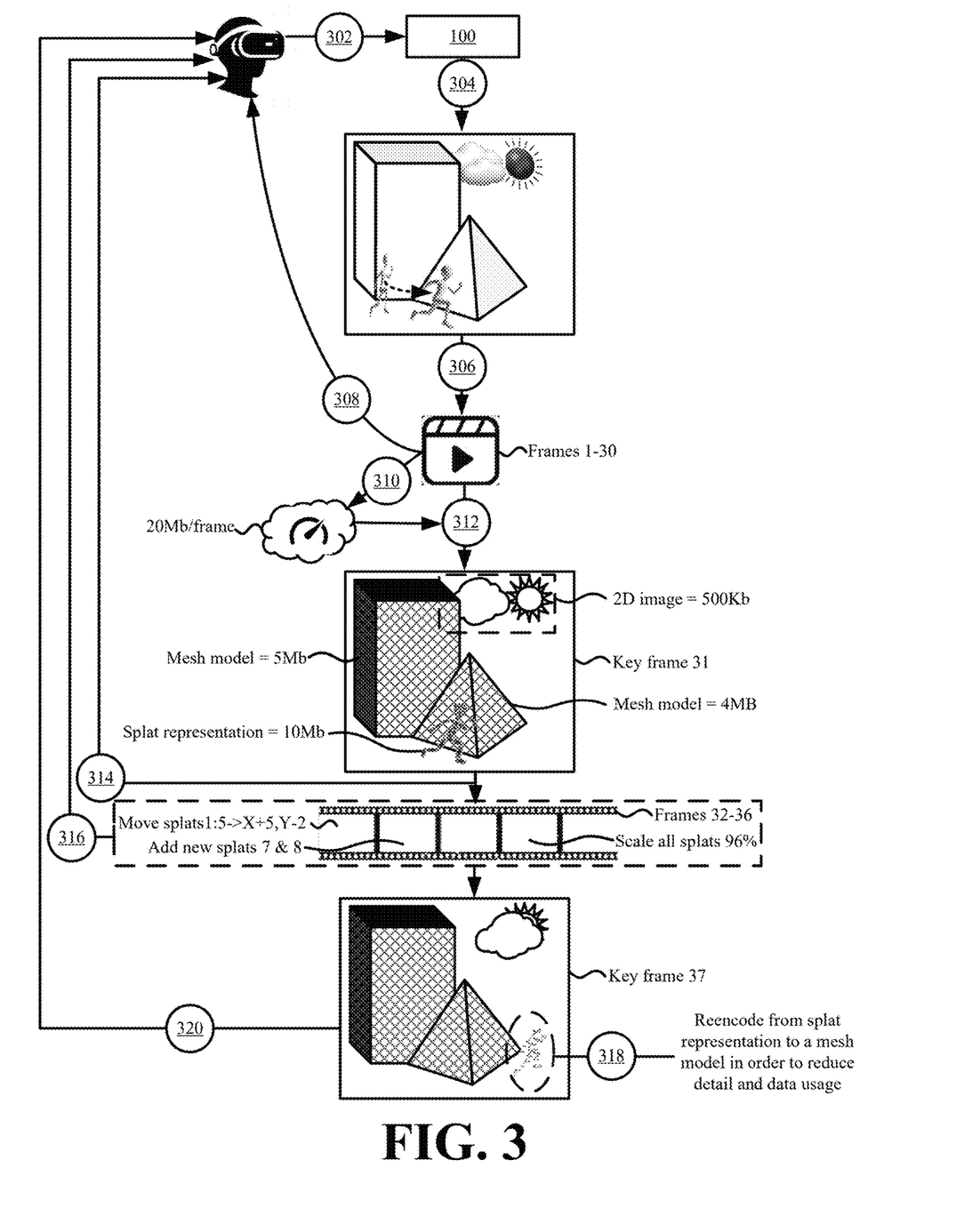
FIG. 3 illustrates an example for real-time streaming of dynamic 3D content using the different encoding formats in accordance with some embodiments presented herein.

FIG. 3 illustrates an example for real-time streaming of dynamic 3D content using the different encoding formats in accordance with some embodiments presented herein. Real-time streaming system 100 receives (at 302) a request to stream the dynamic 3D content to a user device. In some embodiments, the request may specify a particular frame rate at which to stream the dynamic 3D content. In some other embodiments, the dynamic 3D content may be associated with the particular frame rate or real-time streaming system 100 may be configured to stream various dynamic 3D content at the particular frame rate.

Real-time streaming system 100 retrieves (at 304) the 3D assets for a first set of frames or visualizations of the dynamic 3D content spanning a particular time duration. For instance, real-time streaming system 100 may retrieve (at 304) the 3D assets, their positioning relative to a render position, programmed or artificial intelligence controlled animations for the 3D assets, and/or other data for generating an initial two seconds (e.g., the particular time duration) of the requested dynamic 3D content. The particular time duration is selected to provide real-time streaming system 100 enough time to determine the network performance and to stream enough data for subsequent frames of the dynamic 3D content at the different encoding formats to the user device to provide a continuous and seamless 3D experience at the particular frame rate for the dynamic 3D content.

Real-time streaming system 100 encodes (at 306) the 3D assets for the first set of frames or visualizations as a 2D video or as a set of 2D images. The 2D video or set of 2D images represent a lowest fidelity and lowest data encoding of the 3D assets for the first set of frames or visualizations. The 2D video or set of 2D images represent an encoding of the dynamic 3D content in a first encoding format. Inputs or interactions that the user has with the dynamic 3D content may not be reflected in the 2D video or the set of 2D images.

Real-time streaming system 100 streams (at 308) the 2D video or the set of 2D images to the user device in response to the request for the dynamic 3D content to minimize the time by which an initial frame of the dynamic 3D content is presented on the user device. By streaming (at 308) the 2D video or the set of 2D images instead of 3D primitives of a 3D format (e.g., mesh model, splat representation, or point cloud), real-time streaming system 100 improves upon the real-time experience by eliminating any 3D rendering effort by the user device before the first frame is presented. In other words, the user device may simply playback the 2D video without rendering 3D primitives to generate initial frame of the dynamic 3D content.

Contemporaneously, real-time streaming system 100 tracks (at 310) the network performance. Based on tracked (at 310) network performance, real-time streaming system 100 determines an amount of data that may be encoded to maximize fidelity of each subsequent frame or visualization while remaining within network performance constraints for streaming the dynamic 3D content to the user device in real-time without buffering or interruption. for instance, Real-time streaming system 100 determines how much data per frame of the dynamic 3D content it is able to send to the user device to maintain playback of the dynamic 3D content at the particular frame rate without buffering or interruption.

Real-time streaming system 100 selects (at 312) different encoding formats with which to encode the 3D assets of a next key frame or visualization of the dynamic 3D content with different fidelities in order to prioritize the quality and detail of the 3D assets in the field-of-view foreground, center, and/or that have the largest sizes while staying within the total amount of data that may be encoded to retain the real-time streaming of the dynamic 3D content. A key frame represents a frame within the dynamic 3D content at which the encoding format and/or fidelity of the 3D assets may be changed and/or that contains all data need for rendering or presenting the frame on the user device without referencing previously streamed data from earlier frames. To conserve data, real-time streaming system 100 may select the key frames to be every Nth number of frames, to be a frame where there is a lot of visual differentiation, where a change occurs to the tracked (at 310) network performance.

Real-time streaming system 100 streams (at 314) the 3D assets for the next key frame or visualization using the selected (at 312) encoding formats. For instance, a first 3D asset nearest the field-of-view foreground and/or center is streamed (at 314) as a splat representation, second and third 3D assets farther from the field-of-view foreground and/or center are streamed (at 314) as mesh models, and a fourth 3D asset in the field-of-view background and/or periphery is streamed (at 314) as a 2D image. The total amount of data for these 3D assets in the selected (at 312) encoding formats may equal 19.5 Megabytes (Mb) which is within the determined real-time streaming constraint of 20 Mb per frame based on the tracked (at 310) network performance.

Real-time streaming system 100 streams (at 316) changes to the 3D assets in their respective encoding formats for frames or visualizations between the last key frame or visualization and the next key frame or visualization. The changes may include transformations to the 3D primitives of a mesh model, splat representation, or point cloud as well as additions or removal of one or more 3D primitives from the mesh model, splat representation, or point cloud. A transformation may be expressed as a mathematical formula, matrix, positional adjustment, visual characteristic adjustment, or other adjustment that is linked to identifiers or indices of one or more 3D primitives affected by the transformation.

In some embodiments, the changes (at 316) may include upscaling or increasing the fidelity of a 3D asset. For instance, real-time streaming system 100 may switch the encoding format for a particular 3D asset if there is sufficient data remaining to stream the non-key frame with the other changes or transformations needed to update the positions and/or visual characteristics of the 3D assets. There may be no changes or transformations from one non-key frame to another. Accordingly, real-time streaming system 100 may stream a low fidelity encoding of a particular 3D asset at a higher fidelity encoding in the data for those non-key frames in order to gradually increase the quality or detail of the particular 3D asset during the streaming of the non-key frames.

At a next key frame, real-time streaming system 100 reevaluates the selection of encoding formats for the 3D assets and may change (at 318) the 3D asset encoding formats based on updated depths, positions, and/or sizes in the field-of-view of the next key frame and/or changes to the network performance. For instance, if the network performance decreases, real-time streaming system 100 may stream fewer 3D assets at the higher fidelity encoding formats to reduce the total amount of streamed data per frame and ensure that the real-time experience associated with the dynamic 3D content is preserved. Similarly, real-time streaming system 100 may select a lower fidelity encoding format for a 3D asset that has moved from the field-of-view center and foreground to farther in the periphery and background. Real-time streaming system 100 may stream (at 320) the 3D assets for the next key frame in the updated encoding formats so that the total data for the next key frame may be delivered to the user device without buffering or interrupting the dynamic 3D content viewing experience.

Figure 4:
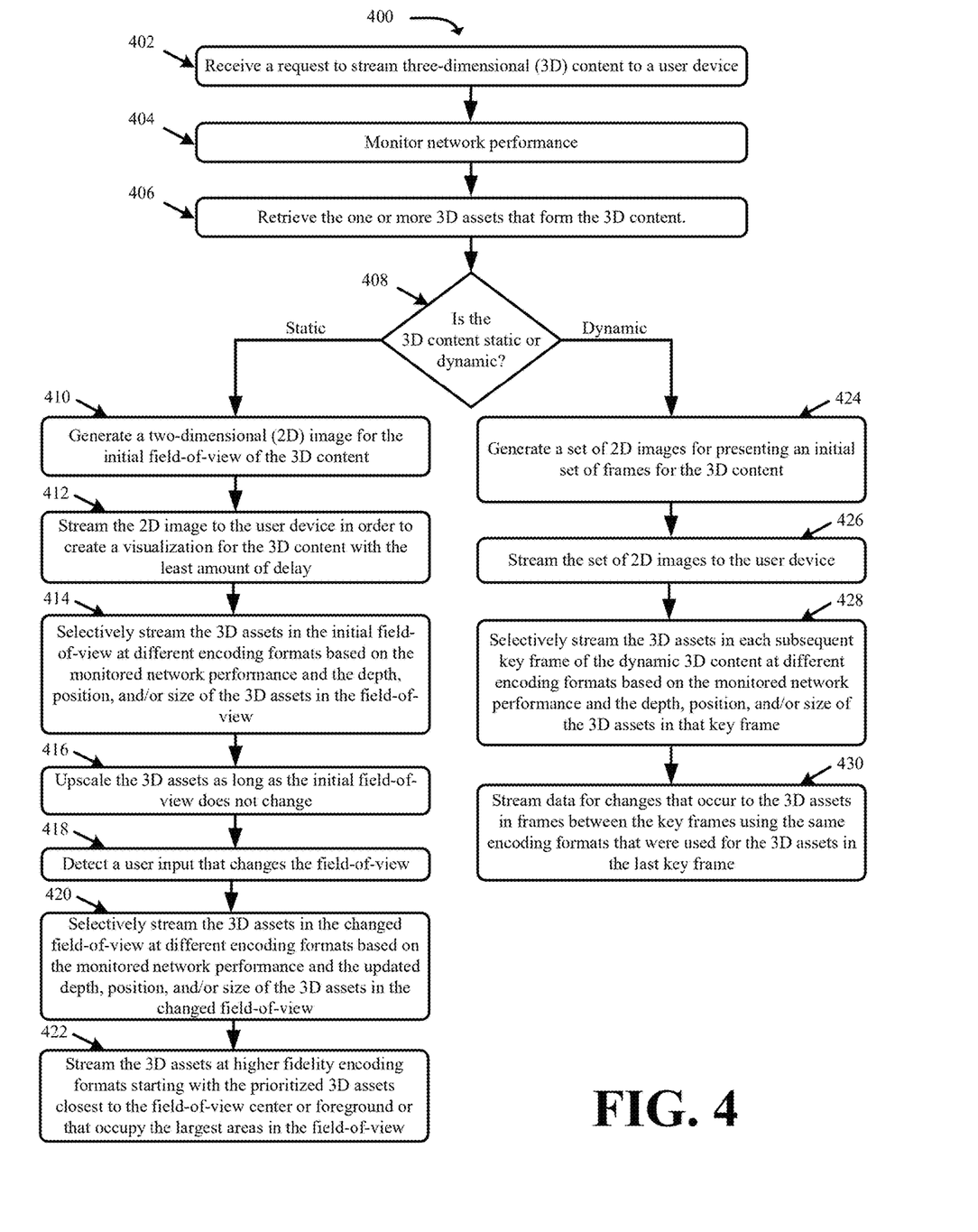
FIG. 4 presents a process for the real-time streaming of 3D content in accordance with some embodiments presented herein.

FIG. 4 presents a process 400 for the real-time streaming of 3D content in accordance with some embodiments presented herein. Process 400 is implemented by real-time streaming system 100.

Real-time streaming system 100 includes one or more devices, machines, or servers with processor, memory, storage, network, and/or other hardware resources for the real-time distribution of 3D content over a data network. Real-time streaming system 100 may be part of a 3D streaming service provider from which different user devices remotely access different 3D content including 3D games, spatial computing experiences (e.g., virtual reality, mixed reality, augment reality, and/or other enhanced reality experiences), 3D videos, 3D environments, 3D scenes, and/or other static or dynamic 3D visual experiences.

Process 400 includes receiving (at 402) a request to stream 3D content to a user device. The request may be issued by the user device as a HypterText Transfer Protocol (HTTP) GET message or request message type of another protocol. The request may specify an initial field-of-view from which to present the 3D content or a position and/or orientation for a virtual camera in a 3D space of the 3D content that establishes the initial field-of-view.

Process 400 includes monitoring (at 404) performance of the network connection connecting the user device to real-time streaming system 100. Monitoring (at 404) the network performance may include determining the available bandwidth, latency, and/or other parameters related to the amount of data that may be sent to the user device in a period of time.

Process 400 includes retrieving (at 406) the one or more 3D assets that form the 3D content. The one or more 3D assets correspond to the different visual elements that populate the 3D space of the 3D content.

The one or more 3D assets may be stored in separate files or in separate data structures. The 3D content definition may identify each of the one or more 3D assets, where and when the 3D assets are presented in the 3D space of the 3D content, programmatic controlling of the 3D assets (e.g., artificial intelligence that directs non-playable characters), when to apply changes to the 3D assets, and/or other instructions for presenting the 3D content.

Retrieving (at 404) the one or more 3D assets may include retrieving each 3D asset in a highest fidelity or in a point cloud encoding format. Alternatively, real-time streaming system 100 may retrieve (at 404) each 3D asset encoded in multiple different encoding formats (e.g., 2D image, mesh model, splat representation, and/or point cloud).

Process 400 includes determining (at 408) whether the 3D content is static or dynamic. Static 3D content includes a 3D scene or 3D environment that does not change without user input. The user input may include changing the position and/or orientation of a virtual camera in order to change the field-of-view and/or to move within the 3D space of the 3D content to view various elements from different vantage points. Dynamic 3D content includes a 3D environment that changes without user input. For instance, the 3D environment may include animated characters or objects, artificial intelligence controlled characters or objects, animations of 3D assets, and/or a 3D video that is presented at a particular frame rate.

Process 400 includes generating (at 410) a 2D image for the initial field-of-view of the 3D content in response to determining that the 3D content is static. Real-time streaming system 100 generates (at 410) the 2D image by positioning the one or more 3D assets in a 3D space according to the 3D content definition and by rendering the initial field-of-view.

Process 400 includes streaming (at 412) the 2D image to the user device in order to create a visualization for the 3D content with the least amount of delay as the 2D image is the smallest size visualization that may be created for the initial field-of-view and that may be streamed in the least amount of time relative to other available encoding formats. Accordingly, the user device receives an immediate reply to the request (e.g., the 2D image) that gives the user an impression that the 3D content is streamed in real-time with no lag or buffering.

Process 400 includes selectively streaming (at 414) the 3D assets in the initial field-of-view at different encoding formats based on the monitored (at 404) network performance and the depth, position, and/or size of the 3D assets in the initial field-of-view. For instance, if the network performance exceeds a specific threshold, real-time streaming system 100 may stream (at 414) the 3D assets at the field-of-view center and foreground as point clouds before streaming 3D assets surrounding the center and foreground as splat representations. If the network performance does not exceed the specific threshold, real-time streaming system 100 may stream (at 414) the 3D assets at the field-of-view center and foreground as splat representations before streaming the 3D assets surrounding the center and foreground as mesh models to reduce the amount of data streamed for the initial field-of-view.

If no change occurs to the field-of-view, process 400 includes upscaling (at 416) the 3D assets as long as the initial field-of-view does not change. Upscaling (at 416) the 3D assets includes streaming the 3D assets at higher fidelity encoding formats beginning with the prioritized 3D assets at the field-of-view center, foreground, and/or that are presented with the largest size in the initial field-of-view and then other upscaling 3D assets in an ordering based on increasing 3D asset depths, distances from the field-of-view center, and/or decreasing size in the field-of-view. Real-time streaming system 100 progressively upscales or increases the detail and quality of the 3D assets for static 3D content until a user input changes the field-of-view.

Process 400 includes detecting (at 418) a user input that changes the field-of-view. The user input may include moving the virtual camera in order to view the static 3D content from a different vantage point. In some embodiments, the user input is generated based on the user changing where they are looking or by issuing inputs via a controller that moves the virtual camera position.

Process 400 includes selectively streaming (at 420) the 3D assets in the changed field-of-view at different encoding formats based on the monitored (at 404) network performance and the updated depth, position, and/or size of the 3D assets in the changed field-of-view to preserve the real-time responsiveness of the 3D streaming experience. Real-time streaming system 100 determines the amount of data that it may send to present the changed field-of-view in real-time. For example, the real-time responsiveness may include configuring real-time streaming system 100 to update the field-of-view in under 500 milliseconds. Accordingly, real-time streaming system 100 may determine the total amount of data it may stream to the user device in under 500 millisecond given the current network performance, and may select the different encoding formats for the 3D assets in the changed field-of-view to prioritize fidelity of the frontmost, centermost, and/or largest 3D assets while keeping the encoded data for all 3D assets of the changed field-of-view within the determined total amount of data.

Process 400 includes progressively increasing fidelity of the 3D assets in the changed field-of-view by streaming (at 422) the 3D assets at higher fidelity encoding formats starting with the prioritized 3D assets closest to the field-of-view center or foreground or that occupy the largest areas in the field-of-view until there is another user input that changes the field-of-view again. Accordingly, real-time streaming system 100 streams the 3D assets of the changed field-of-view in different encoding formats to provide a continuous and uninterrupted visualization of the 3D content given the current network conditions, and then gradually streams the 3D assets in higher fidelity encoding formats.

Process 400 includes generating (at 424) a set of 2D images for presenting an initial set of frames for the 3D content in response to determining that the 3D content is dynamic. The set of 2D images may correspond to a splash screen or a prerendered first few seconds of the dynamic 3D content. Real-time streaming system 100 generates (at 424) the set of 2D images by rendering the 3D assets and any changes to those 3D assets that occur over the initial set of frames from a field-of-view that is defined for the initial set of frames.

Process 400 includes streaming (at 426) the set of 2D images to the user device. Real-time streaming system 100 streams (at 426) the set of 2D images to present the initial set of frames with the least latency and/or delay in response to the request. In particular, the user device may play or present the set of 2D images without rendering any 3D primitives of any 3D encoding format.

Process 400 includes selectively streaming (at 428) the 3D assets in each subsequent key frame of the dynamic 3D content at different encoding formats based on the monitored (at 404) network performance and the depth, position, and/or size of the 3D assets in that key frame. Real-time streaming system 100 determines the frame rate at which the dynamic 3D content is presented, determines the total amount of data that it may stream to the user device for each frame based on the monitored (at 404) network performance, and selects the different encoding formats to prioritize the fidelity of the 3D assets that are closest to the key frame field-of-view center, foreground, and/or that occupy the largest area in the field-of-view while ensuring that the total data for the key frame is within the determined total amount of data such that the key frame is delivered in real-time without interrupting the dynamic 3D content viewing experience or introducing any buffering.

The next frame after the set of 2D images or the initial set of frames is a key frame. In some embodiments, a key frame includes a frame of the dynamic 3D content that changes by a threshold amount from a previous frame of the dynamic 3D image or a frame where all data for the 3D assets in the corresponding field-of-view needs to be streamed. In some other embodiments, each frame of the dynamic 3D content may be defined as a key frame.

Process 400 includes streaming (at 430) data for changes that occur to the 3D assets in frames between the key frames using the same encoding formats that were used for the 3D assets in the last key frame. When there is less than the threshold amount of change between frames, it is more efficient to stream (at 430) the changes to the 3D assets than it is to stream the 3D primitives for the 3D assets.

The changes may include transformations (e.g., mathematical formulas, expressions, matrices, and/or other instructions to modify a 3D asset) and indices for 3D primitives that are affected by those transformations. The transformations may reposition a subset of the 3D primitives, change their shape, and/or change their visual characteristics (e.g., colors, opacity, reflectivity, etc.). The changes may also include identifying 3D primitives from the 3D asset mesh models, splat representations, or point clouds to remove and/or providing data for new 3D primitives to include with the previously streamed set of 3D primitives.

In some embodiments, when the data for the changes in a particular frame is less than the total amount of data that real-time streaming system 100 may stream to the user device in real-time, real-time streaming system 100 may reencode one or more of the 3D assets to a higher fidelity encoding format than the encoding format that was used to encode that same 3D asset in the last key frame, and may stream the reencoded and upscaled 3D asset along with changed 3D asset data as the updated data for the particular frame. In this manner, real-time streaming system 100 may selectively increase the quality and/or fidelity of the 3D assets in between key frames of the dynamic 3D content.

In some embodiments, real-time streaming system 100 makes a determination on whether to stream a particular 3D asset at a lower fidelity encoding format or to retain the particular 3D asset as is even if the particular 3D asset has become deprioritized in a next frame or visualization of the 3D content as a result of moving further into the background or periphery or as a result of occupying less space in the field-of-view. Also, the network performance may be reduced such that there is less bandwidth available to stream the next frame or visualization. In some such embodiments, real-time streaming system 100 may base the decision on whether to downscale or reduce fidelity for a 3D asset based on network performance and/or rendering performance of the user device.

Figure 5:
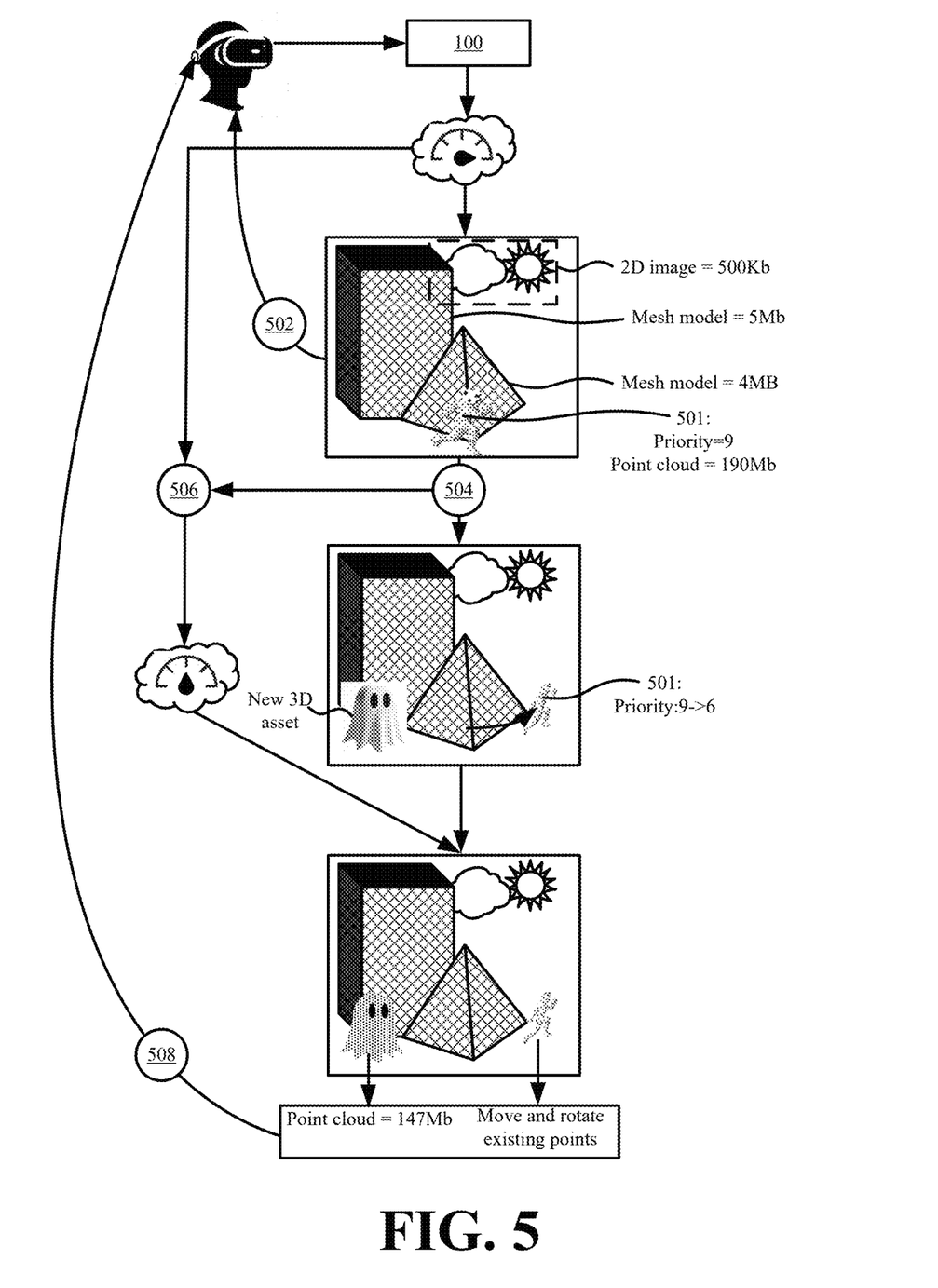
FIG. 5 illustrates an example of selectively reencoding 3D assets for different frames or visualizations of 3D content in accordance with some embodiments presented herein.

FIG. 5 illustrates an example of selectively reencoding 3D assets for different frames or visualizations of 3D content in accordance with some embodiments presented herein. Real-time streaming system 100 selectively streams (at 502) the 3D assets in a particular frame of the 3D content at different encoding formats.

At a next key frame or subsequent frame of the 3D content, real-time streaming system 100 determines (at 504) that 3D asset 501 has been deprioritized. 3D asset 501 was previously streamed (at 502) as a point cloud to the user device as a result of being located in the particular frame field-of-view foreground and center. In the next key frame or subsequent frame, 3D asset 501 moves further into the background and in the periphery resulting in the deprioritization of 3D asset 501.

Real-time streaming system 100 also detects (at 506) a reduction in the network performance. For instance, the network may become congested or experiences a link failure. Alternatively, the bandwidth to the user device may be reduced as a result of the user device downloading other content from other sources.

Real-time streaming system 100 determines that the remaining bandwidth is better allocated to streaming new 3D assets or existing 3D assets using different higher fidelity encoding formats than to restream 3D asset 501 at a lower encoding format. Moreover, real-time streaming system 100 may determine that the user device has additional rendering resources available to render a second point cloud along with the point cloud for 3D asset 501 and the mesh models for other 3D assets. In particular, the 3D primitives for 3D asset 501 were previously streamed to the user device. Rather than resend 3D asset 501 encoded with 3D primitives of a lower fidelity 3D encoding format, real-time streaming system 100 streams (at 508) changes for 3D asset 501 to the user device. The changes require significantly less bandwidth and/or data than restreaming 3D asset 501 with an entire new set of 3D primitives. For instance, the changes may specify repositioning and/or rotating the previously streamed points of 3D asset 501 in the next key frame or subsequent frame of the 3D content such that the user device may render the previously streamed point data for 3D asset 501 at the updated position and/or orientation. Real-time streaming system 100 may allocate the remaining bandwidth to stream a new 3D asset at a higher fidelity encoding format such that the changes 3D asset 501 and the 3D primitives for the new 3D asset may be presented on the user device without buffering or interrupting the real-time 3D experience on the user device.

However, if the rendering performance of the user device was at a threshold level of usage, real-time streaming system 100 may downscale 3D asset 501 from the rendering intensive point cloud encoding format to an encoding format that requires less rendering resources (e.g., a splat representation or a mesh model). Similarly, real-time streaming system 100 may reduce the encoding format of any 3D assets so as to reduce the rendering resource utilization on the user device while keeping the total data that is streamed for the next key frame or subsequent frame within network performance constraints for the real-time delivery of the data.

Figure 6:
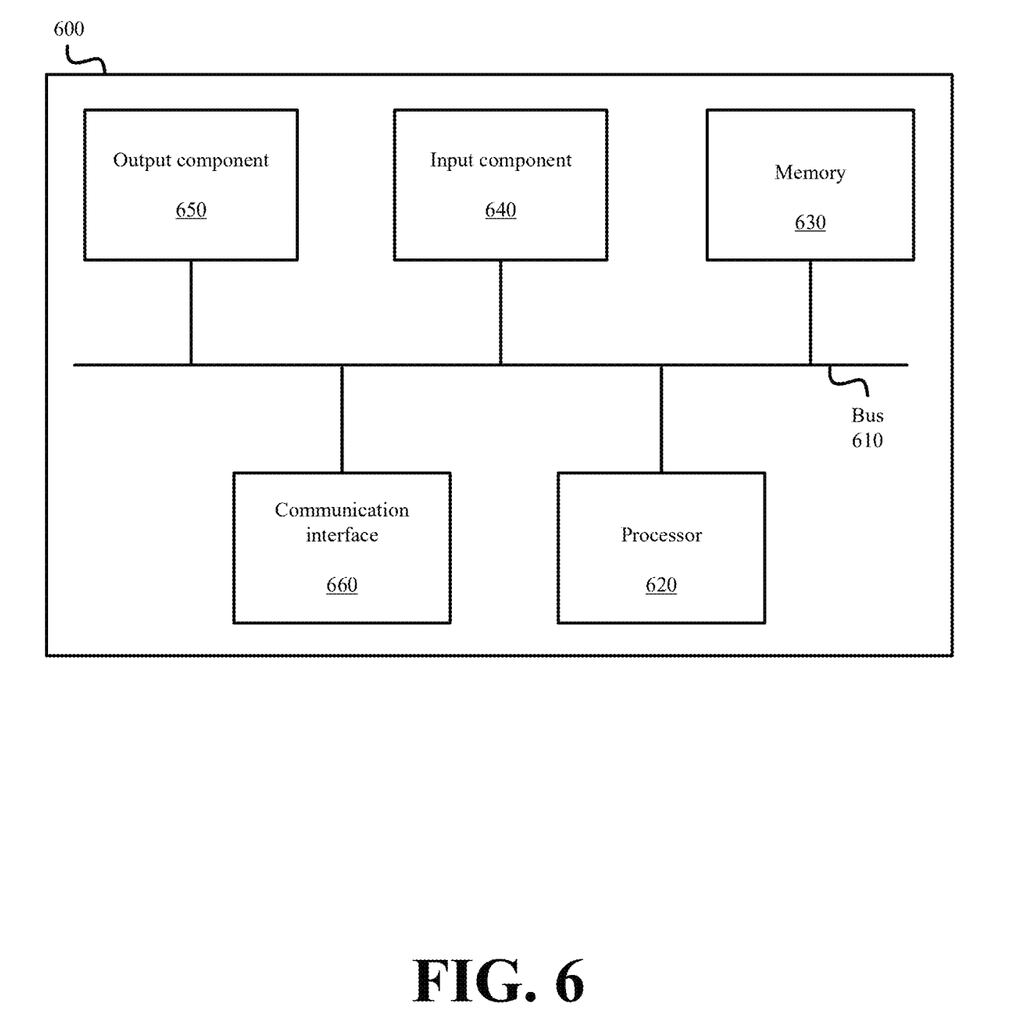
FIG. 6 illustrates example components of one or more devices, according to one or more embodiments described herein.

FIG. 6 is a diagram of example components of device 600. Device 600 may be used to implement one or more of the tools, devices, or systems described above (e.g., real-time streaming system 100, user device, etc.). Device 600 may include bus 610, processor 620, memory 630, input component 640, output component 650, and communication interface 660. In another implementation, device 600 may include additional, fewer, different, or differently arranged components.

Bus 610 may include one or more communication paths that permit communication among the components of device 600. Processor 620 may include a processor, microprocessor, or processing logic that may interpret and execute instructions. Memory 630 may include any type of dynamic storage device that may store information and instructions for execution by processor 620, and/or any type of non-volatile storage device that may store information for use by processor 620.

Input component 640 may include a mechanism that permits an operator to input information to device 600, such as a keyboard, a keypad, a button, a switch, etc. Output component 650 may include a mechanism that outputs information to the operator, such as a display, a speaker, one or more LEDs, etc.

Communication interface 660 may include any transceiver-like mechanism that enables device 600 to communicate with other devices and/or systems. For example, communication interface 660 may include an Ethernet interface, an optical interface, a coaxial interface, or the like. Communication interface 660 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 600 may include more than one communication interface 660. For instance, device 600 may include an optical interface and an Ethernet interface.

Device 600 may perform certain operations relating to one or more processes described above. Device 600 may perform these operations in response to processor 620 executing software instructions stored in a computer-readable medium, such as memory 630. A computer-readable medium may be defined as a non-transitory memory device. A memory device may include space within a single physical memory device or spread across multiple physical memory devices. The software instructions may be read into memory 630 from another computer-readable medium or from another device. The software instructions stored in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   receiving a request to stream three-dimensional (3D) content over a data network to a user device;
   retrieving one or more 3D assets associated with the 3D content;
   generating a two-dimensional (2D) image for a first presentation of the 3D content at a first fidelity, wherein generating the 2D image comprises rendering the one or more 3D assets;
   streaming the 2D image in response to the request; and
   increasing a fidelity of a prioritized 3D asset from the one or more 3D assets in the first presentation during a period of time that the 3D content does not change, wherein increasing the fidelity comprises streaming a plurality of 3D primitives that represent the prioritized 3D asset in a first encoding format that is different than a format associated with the 2D image and that increases the fidelity of the prioritized 3D asset in a second presentation of the 3D content from the first fidelity to a greater second fidelity.

2. The method of claim 1, wherein the prioritized 3D asset is a first prioritized 3D asset, the method further comprising:
   increasing a fidelity of a second prioritized 3D asset from the one or more 3D assets after increasing the fidelity of the first prioritized 3D asset, wherein increasing the fidelity of the second prioritized 3D asset comprises streaming a plurality of 3D primitives that represent the second prioritized 3D asset in a second encoding format that is different than the first encoding format and that increases the fidelity of the second prioritized 3D asset in the second presentation from the first fidelity to a third fidelity, wherein the third fidelity has more loss and preserves less detail than the second fidelity.

3. The method of claim 2, wherein the first encoding format corresponds to a point cloud format and the plurality of 3D primitives that represent the first prioritized 3D asset are defined as points, and wherein the second encoding format corresponds to a splat representation format and the plurality of 3D primitives that represent the second prioritized 3D asset are defined as splats.

4. The method of claim 2, wherein the first encoding format corresponds to a splat representation format and the plurality of 3D primitives that represent the first prioritized 3D asset are defined as splats, and wherein the second encoding format corresponds to a mesh model format and the plurality of 3D primitives that represent the second prioritized 3D asset are defined as meshes.

5. The method of claim 1 further comprising:
   selecting the prioritized 3D asset from the one or more 3D assets as a particular 3D asset that is one or more of a frontmost, centermost, or largest size 3D asset in the first presentation.

6. The method of claim 1 further comprising:
   monitoring a performance of the data network to the user device; and
   selecting the first encoding format from a plurality of encoding formats based on the first encoding format generating the plurality of 3D primitives with a total amount of data that is less than an amount supported by the performance of the data network for a real-time experience.

7. The method of claim 1 further comprising:
   determining an amount of time with which to generate a next visualization of the 3D content;
   monitoring a performance of the data network to the user device;
   encoding the one or more 3D assets in two or more different encoding formats with a total amount of data used in encoding the one or more 3D assets in the two or more different encoding formats being within a maximum amount of data that is computed from the amount of time and the performance of the data network; and
   streaming the one or more 3D assets encoded in the two or more different encoding formats within the amount of time.

8. The method of claim 1 further comprising:
   determining a frame rate at which to present different visualizations of the 3D content; and
   encoding the one or more 3D assets in two or more different encoding formats to have a total amount of data that is streamable to the user device at the frame rate.

9. The method of claim 1 further comprising:
   generating additional 2D images for the first presentation; and
   presenting a video or animation of a specific duration on the user device at the first fidelity by streaming the additional 2D images with the 2D image.

10. The method of claim 1 further comprising:
    determining performance of the data network to the user device; and
    selecting different encoding formats to encode the one or more 3D assets with a total data size for the second presentation to be less than a threshold size that is determined based on the performance of the data network and a desired real-time responsiveness.

11. The method of claim 1, wherein the one or more 3D assets are defined with 3D primitives of a second encoding format that encodes the one or more 3D assets with a higher fidelity than the first encoding format.

12. The method of claim 11 further comprising:
generating the prioritized 3D asset in the first encoding format by converting a first plurality of 3D primitives of the prioritized 3D asset defined in the second encoding format to a second plurality of 3D primitives that are defined in the first encoding format.

13. The method of claim 12, wherein the first plurality of 3D primitives comprises one of a plurality of meshes, a plurality of splats, or a plurality of points, and wherein the second plurality of 3D primitives comprises a different one the plurality of meshes, the plurality of splats, or the plurality of points.

14. A real-time streaming system comprising:
one or more hardware processors configured to:
receive a request to stream three-dimensional (3D) content over a data network to a user device;
retrieve one or more 3D assets associated with the 3D content;
generate a two-dimensional (2D) image for a first presentation of the 3D content at a first fidelity, wherein generating the 2D image comprises rendering the one or more 3D assets;
stream the 2D image in response to the request; and
increase a fidelity of a prioritized 3D asset from the one or more 3D assets in the first presentation during a period of time that the 3D content does not change, wherein increasing the fidelity comprises streaming a plurality of 3D primitives that represent the prioritized 3D asset in a first encoding format that is different than a format associated with the 2D image and that increases the fidelity of the prioritized 3D asset in a second presentation of the 3D content from the first fidelity to a greater second fidelity.

15. The real-time streaming system of claim 14, wherein the prioritized 3D asset is a first prioritized 3D asset, and wherein the one or more hardware processors are further configured to:
increase a fidelity of a second prioritized 3D asset from the one or more 3D assets after increasing the fidelity of the first prioritized 3D asset, wherein increasing the fidelity of the second prioritized 3D asset comprises streaming a plurality of 3D primitives that represent the second prioritized 3D asset in a second encoding format that is different than the first encoding format and that increases the fidelity of the second prioritized 3D asset in the second presentation from the first fidelity to a third fidelity, wherein the third fidelity has more loss and preserves less detail than the second fidelity.

16. The real-time streaming system of claim 15, wherein the first encoding format corresponds to a point cloud format and the plurality of 3D primitives that represent the first prioritized 3D asset are defined as points, and wherein the second encoding format corresponds to a splat representation format and the plurality of 3D primitives that represent the second prioritized 3D asset are defined as splats.

17. The real-time streaming system of claim 15, wherein the first encoding format corresponds to a splat representation format and the plurality of 3D primitives that represent the first prioritized 3D asset are defined as splats, and wherein the second encoding format corresponds to a mesh model format and the plurality of 3D primitives that represent the second prioritized 3D asset are defined as meshes.

18. The real-time streaming system of claim 14, wherein the one or more hardware processors are further configured to:
select the prioritized 3D asset from the one or more 3D assets as a particular 3D asset that is one or more of a frontmost, centermost, or largest size 3D asset in the first presentation.

19. The real-time streaming system of claim 14, wherein the one or more hardware processors are further configured to:
monitor a performance of the data network to the user device; and
select the first encoding format from a plurality of encoding formats based on the first encoding format generating the plurality of 3D primitives with a total amount of data that is less than an amount supported by the performance of the data network for a real-time experience.

20. A non-transitory computer-readable medium storing instructions that, when executed by one or more processors of a dynamic streaming system, cause the dynamic streaming system to perform operations comprising:
receiving a request to stream three-dimensional (3D) content over a data network to a user device;
retrieving one or more 3D assets associated with the 3D content;
generating a two-dimensional (2D) image for a first presentation of the 3D content at a first fidelity, wherein generating the 2D image comprises rendering the one or more 3D assets;
streaming the 2D image in response to the request; and
increasing a fidelity of a prioritized 3D asset from the one or more 3D assets in the first presentation during a period of time that the 3D content does not change, wherein increasing the fidelity comprises streaming a plurality of 3D primitives that represent the prioritized 3D asset in a first encoding format that is different than a format associated with the 2D image and that increases the fidelity of the prioritized 3D asset in a second presentation of the 3D content from the first fidelity to a greater second fidelity.

* * * * *